United States Patent [19]

Kovács et al.

[11] Patent Number: 4,860,798
[45] Date of Patent: Aug. 29, 1989

[54] REINFORCED FLEXIBLE HOSE

[75] Inventors: Ferenc Kovács; Miklósné Lengyel; Tibor Nagy; Sándor Antal, all of Budapest; György Gyöngyösi, Szeged; László Palotás; Nándor Pfisztner, both of Budapest, all of Hungary

[73] Assignee: Taurus Gumiipari Vallalat, Budapest, Hungary

[21] Appl. No.: 138,191

[22] PCT Filed: Sep. 25, 1986

[86] PCT No.: PCT/HU86/00051
§ 371 Date: Nov. 25, 1987
§ 102(e) Date: Nov. 25, 1987

[87] PCT Pub. No.: WO87/02116
PCT Pub. Date: Apr. 9, 1987

[30] Foreign Application Priority Data

Sep. 25, 1985 [HU] Hungary ................ 3642/85

[51] Int. Cl.⁴ .................................... F16L 11/08
[52] U.S. Cl. .................... 138/133; 138/130; 138/174
[58] Field of Search ........... 138/129, 130, 133, 134, 138/172, 174

[56] References Cited

U.S. PATENT DOCUMENTS

| | | | |
|---|---|---|---|
| 2,747,616 | 5/1956 | De Ganahl | 138/130 |
| 2,825,364 | 3/1958 | Cullen et al. | 138/130 |
| 3,107,698 | 10/1963 | Baker et al. | 138/130 |
| 3,566,924 | 3/1971 | Ambrus et al. | 138/130 |
| 3,729,028 | 4/1973 | Horvath et al. | 138/130 |
| 3,896,858 | 7/1975 | Whatley | 138/130 |
| 4,157,181 | 6/1979 | Cecka | 138/130 |
| 4,248,062 | 2/1981 | McLain et al. | 138/130 |
| 4,403,631 | 9/1983 | Abdullaev et al. | 138/130 |
| 4,431,034 | 2/1984 | Abdullaev et al. | 138/130 |
| 4,649,963 | 3/1987 | Raghavan et al. | 138/130 |

FOREIGN PATENT DOCUMENTS

| | | | |
|---|---|---|---|
| 1650142 | 9/1970 | Fed. Rep. of Germany | 138/130 |
| 833492 | 10/1938 | France | 138/130 |
| 949282 | 8/1982 | U.S.S.R. | |
| 949283 | 8/1982 | U.S.S.R. | |
| 949284 | 8/1982 | U.S.S.R. | |
| 960483 | 9/1982 | U.S.S.R. | |
| 994853 | 2/1983 | U.S.S.R. | |
| 953833 | 4/1964 | United Kingdom | |

*Primary Examiner*—James E. Bryant, III
*Attorney, Agent, or Firm*—Handal & Morofsky

[57] ABSTRACT

In a flexible hose reinforced by wire plies, at least two wire plies are provided and the wires of each wire ply are disposed in helical convolutions about the longitudinal axis of the hose.

The improvement is in that the wire plies satisfy the following formula:

$$1.05 > \frac{\sum_{b=1}^{l} r_b N_b F_b \cos \alpha_b}{\sum_{j=1}^{m} r_j N_j F_j \cos \alpha_j} > 0.95$$

wherein:
subscript b indicated the plies arranged with left hand thread,
subscript j indicates the wire plies arranged with right hand thread,
$r_b$ and $r_b$ are the mean radii of the wire plies,
$N_b$ and $N_b$ are the number of wires in each wire ply,
$F_b$ and $F_b$ are the tensile strength of the wires,
$\alpha_b$ and $\alpha_j$ are the angles of lay of the respective wire plies,
l stands for the number of wire plies with left hand thread,
m is the number of wire plies with right hand thread.

11 Claims, 1 Drawing Sheet

REINFORCED FLEXIBLE HOSE

FIELD OF THE INVENTION

The invention relates to a flexible hose reinforced by wire plies, wherein at least two wire plies are provided and the reinforcing wires of each ply are disposed in helical convolutions about the longitudinal axis of the hose. Furthermore, the hose is provided with at least one inner and outer layer each pressure-tight, as well as with connecting elements at the ends.

STATE OF THE ART

As it is known, such reinforced flexible hoses have to cope with ever increasing requirements. Nowadays, in the oil industry liquid-bearing hoses with internal diameters of 50 to 100 and more millimeters are needed which have an operating pressure of more than 1,000 bar and they have to withstand a burst pressure of around 3,000 bar. Additionally, an increased form stability is also required, in the sence that the hoses should not deform longitudinally or torsionally. But, at the same time, they should have the smallest possible bending stiffness.

Conventional reinforced flexible hoses are unsuitable for fulfilling these requirements simultaneously. With known hoses, the flexibility of the hoses can be provided and the strength of the hoses is satisfactory but they are not flexible strength, neither with pressures being considerably smaller than 3000 bar.

In the field of the reinforced hoses, a so called equilibrium angle of lay 35° 26' is conventionally used. (Angle of lay is defined in the following manner: the angle of lay is zero if the reinforcing wire is perpendicular to hose axis, and the angle of lay is 90° if the wire is parallel to the hose axis.) In this case, the load bearing of the wire plies being arranged one on the other greatly decreases outwardly and, on the impact of inner pressure, the hoses also deform torsionally.

In some cases, it has been suggested to improve the torsional stability and the uniform load bearing of the plies by deviating from the conventional angle of lay of 35° 16' and by decreasing the angles of lay of the inner wire plies, and to increase the angles of lay for the outer wire plies. With this, the load was thought to be devided into two, the radial loads were intented to be carried by the wire plies being closer to the center of the hose and the axial loads by the ones being farther from it. Such expedients, however, failed to ensure the required flexibility, and the bending stiffness of these hoses was the multiple of that of the hoses with conventional equilibrium, angles of lay, the reason for the latter being in the great angle of lay of the outer wire plies.

This kind of wire reinforced hose is described in SU-PS 941 867 wherein the angle of lay of the two inner wire plies is between 0 and 15 degrees and that of the outer pair of wire plies between 70 and 90 degrees. As it has been shown, the strength utilization of these hoses is not sufficient against inner pressure since the stress in the outer plies is the half of that in the inner plies and the two simmetrically arranged lower plies having the same angle of lay are not loaded uniformly. Followingly, the strength utilization is in the best case only 70 to 75 percent.

Numerous proposals have been suggested to lessen the drawbacks of this construction, and in SU-PS 949 282, 949 283, 949 284 nd 960 483, reinforcing elements are described having various profiles. It has also been suggested to employ a further pair of wire plies with an angles of lay between 30 and 60 degrees. In SU-PS 994 853, a hose with more than two pairs, i.e. more than four wire plies is used and the angles of lay of the wire plies are between 0 and 15 or 70 and 90 degrees. With this, the pressure bearing of the hoses can be enlarged to a certain extent in relation to the original construction but the bending stiffness could not be made less.

In GB-PS 953 833, a reinforced hoses having a similar construction as mentioned above is described. The inner pressure is carried by a pair of wire plies having the same angle of lay and the axial tension is carried by a pair of wire plies with an angle of lay between 55 and 75 degrees. Therein; another solution is also set forth having a reinforcement of helical shape with small angle of lay between 0 and 10 degrees for carrying the inner pressure. Nevertheless, these constructions are not free from the above said deficiencies.

In HU-PS 169 115, a solution is described, wherein the angles of lay of the respective wire plies are different and their mean value differs at least by 10 minutes from the so called equilibrium pitch angle. At the same time, in the case of more than two wire plies, the satisfaction of a strict arithmetical equation between the angles of lay and the diameters is also required. It is true, that the hoses described in the Hungarian specification have a prominent bendiing flexibility but, especially in the case of more than two wire plies, their strength utilization is not satisfactory. In the case of four wire plies, the burst pressure is acutally only 60 to 80 percent of the theoretical value. The use of more than four plies does not enlarge condiserably the burst pressure, therefore, according to that patent, hoses are produced with not more than four reinforcing wire plies only. The maximal working pressure is not larger than 700 bar.

SUMMARY OF THE INVENTION

An object of this invention is to obviate such deficiencies and to provide a flexible hose reinforced by wire plies which has the desired strength utilization and inner pressure bearing capacity without condiserable tension distortion or elongation and which can be produced for having an arbitrary number of wire plies.

The main idea of this invention is in that the tensile strength and the ultimate elongation of the wires should be taken into consideration, too, for determining the angles of lay and with this, hoses with sufficient strength utilization, small deformations and great bending flexibility can be obtained.

According to the invention, the wire plies reinforcing the hoses satisfy the following formula:

$$1.05 > \frac{\sum_{b=1}^{l} r_B N_b F_b \cos\alpha_b}{\sum_{j=1}^{m} r_j N_j F_j \cos\alpha_j} > 0.95,$$

where
subscript b indicates the wire plies arranged with left hand pitch,
subscript j indicates the wire plies with right hand pitch,
$r_b$ and $r_j$ are the mean radii of the wire plies,
$N_b$ and $N_j$ are the number of wires in each wire plies,
$F_b$ and $F_j$ are the tensile strength of the wires,
l is the number of wire plies with left hand pitch, m is the number of wire plies with right hand pitch, $\alpha_b$ and $\alpha_j$ are the angles of lay of the respective wire plies.

The main importance of this solution is in that by fulfilling the criterion given by the above formula, the wire plies reach the rupture elongation at the same value of inner pressure and the left hand and right hand turning moments is approximately equal.

If the wire plies contain only one type of wire having the same tensile strength in all plies, the formula to be satisfied is simpler:

$$1.05 > \frac{\sum_{b=1}^{l} r_B N_b \cos\alpha_b}{\sum_{j=1}^{m} r_j N_j \cos\alpha_j} > 0.95, \quad (2)$$

where the meaning of the symbols is the same as given for equation (1).

In one of the preferred embodiments of this invention, the following equation is also satisfied by the wire plies of the hose:

$$1.05 > \frac{2 \sum_{k=1}^{n} N_k F_k \sin\alpha_k}{\overline{\lambda}^2 \sum_{k=1}^{n} N_k F_k \frac{\cos^2\alpha_k}{\sin\alpha_k}} \quad 0.95. \quad (3)$$

With this, also the axial deformation of the hose is minimized. The meaning of the symbols in equation (3) is the following:

n is the number of the wire plies, $n = 1 + m$, $\overline{\lambda}$ is the arithmetical mean value of the values k $$\overline{\lambda} = \frac{\sum_{k=1}^{n} \lambda_k}{n},$$

wherein $\lambda_k$ is the relative length of the wire plies at their rupture, $\lambda_k = 1 + \epsilon_k$.

According to the invention, in another preferred embodiment rings being stiffer than the wires of the wire plies or a spiral with small helix angle can be provided in the hose for further reinforcing it.

Investigations have been made which have shown that the deformations of the hose as well as that of the plies can be taken into consideration. On this basis, it has been found that the angles of lay of the wire plies should remain in 2 degrees range around the angles given with the following equation:

$$\tan^2\alpha_k = \frac{1 - x\lambda_k^2}{x(\lambda_k^2 - x^2)} + \frac{y}{x(\lambda_k^2 - x^2)} i_k^2, \quad (6)$$

$k = 1, 2, \ldots, n.$

The value of parameters x and y are given by the following equations:

$$\sum_{k=1}^{n} \frac{f_k \cdot F_k}{\lambda_k \cdot d_k} \cdot \frac{1}{i_k^2} \cdot A_k = 0, \quad (4)$$

$$\sum_{k=1}^{n} \frac{f_k \cdot F_k}{\lambda_k \cdot d_k} \cdot \frac{1}{i_k} \cdot B_k = 0. \quad (5)$$

In the parameters $A_k$ and $B_k$, parameters x and y are implicitly contained:

$$A_k = (-1)^k C_k \sqrt{(\lambda_k^2 - C_k/x)(x^2 - \lambda_k^2)} \ (x^3 - C_k)^{-1}.$$

$$B_k = [2x^2 (x\lambda_k^2 - C_k) + C_k (\lambda_k^2 - x^2)] [2x(x^3 - C_k)]^{-1}.$$

$$C_k = 1 + i_k^2 y.$$

If equation (4) is satisfied, then the hose is free from any torsional deflection and if equation (5) is fulfilled, then the hose will not change its length upon the impact of inner pressure. If these two conditions are satisfied simultaneously, a perfect cooperation and mutual support are ensured between the wire plies. Even if the difference between the angles given by equation (6) and the actual angles of the wire plies are between 3 and 6 degrees, i.e. it is greater than 2 degrees, the burst pressure sinks to a remarkable extent.

The meaning of the symbols in equations (4) to (6) is the following:

$r_k$ is the mean radius of the respective wire plies, n is the number of the wire plies, x, y are the deformation parameters, $f_k$ is the relation of the surface of the respective wire plies covered by reinforcing wires to the whole surface of the given wire ply (covering factor), $F_k$ is the tensile strength of the respective wires, $d_k$ is the diameter of the respective wires, $i_k$ is the quotient of the mean radii of the outer wire ply to the respective wire plies, $\lambda_k$ is the relative length of the respective wires at rupture, $\lambda_k = 1 + \epsilon_k$, $\epsilon_k$ is the elongation of the respective wires at rupture, $\alpha_k$ is the angle of lay of the respective wire plies.

If the wire plies are made of the same type of reinforcing wires having the same characteristics and if the relation of the surface of the wire plies covered by the reinforcing wires to the whole surface of the given wire ply as well as the distance between the neighboring wire plies are approximately the same, the angles of lay of the wire plies can be defined in a simpler way. According to the invention, the relative distance between the neighbouring wire plies can be introduced:

$$z = \Delta r/r_n,$$

where $\Delta_r$ is the distance between two adjacent wire plies (difference between their main radii), $r_n$ is the main radius of the outer wire ply.

In the case of identical reinforcing wires, $\epsilon = \epsilon_1 = \epsilon_2 = \ldots = \epsilon_n$.

Parameters x and y defined by equations (4) and (5) depend only on the relative distance z and on the elongation of the wires at rupture $\epsilon$. With an accuracy being sufficient for the praxis, the angles of lay of the wire plies to the hose axis can be given, according to the invention, as follows:

$$\tan^2\alpha_k = \frac{b_k - a_k}{2} \cdot 100 \epsilon + 2 a_k - b_k. \quad (7)$$

The values of the parameters is given in claim 6.

The experimental investigations with the hose according to this invention resulted in practical angle ranges for the wire plies. In the embodiment of the hose having four wire plies, if the wire plies are numbered from the innermost towards the outermost one, the angles of lay of the first wire ply is between 41 and 54 degrees, that of the second ply between 37 and 46 degrees, of the third ply between 32 and 36 degrees and of the fourth ply between 16 and 31 degrees. In another embodiment having six wire plies, the angle range for the first ply is 43 to 58 degrees, for the second ply 40 to 52 degrees, for the third ply 37 to 45 degrees, for the fourth ply 33 to 38 degrees, for the fifth ply 25 to 32 degrees and for the sixth ply 12 to 27 degrees. Finally, in the embodiment of the hose in this invention having eight wire plies, the mentioned angle ranges are for the first ply 45 to 61 degrees, for the second ply 43 to 56 degrees, for the third ply 40 to 51 degrees, for the fourth ply 37 to 46 degrees, for the fifth ply 34 to 40 degrees, for the sixth ply 29 to 34 degrees, for the seventh ply 21 to 30 degrees and for the eigth ply 10 to 24 degrees.

BRIEF DESCRIPTION OF THE DRAWINGS

Further objects and details of the invention will be described hereinafter with reference to the accompanying drawings on the basis of preferred embodiments. In the drawing.

DETAILED DESCRIPTION OF PREFERRED EMBODIMENTS

Figure 1:
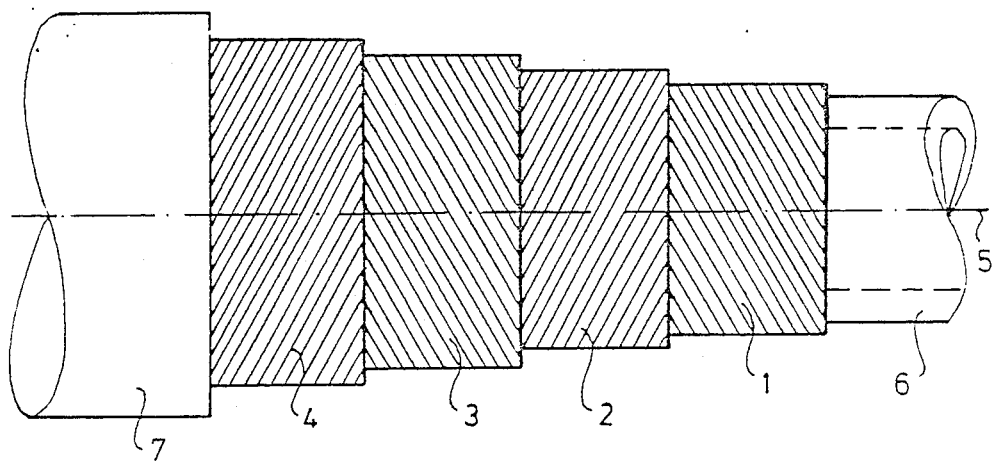
FIGS. 1 and 2 show schematic side views of different exemplified hose constructions according to the invention, the component portions of the hose covers being broken away progressively to illustrate the nature of the several components.

Referring now to FIG. 1, this preferred embodiment has four reinforcing wire plies 1, 2, 3, and 4 each of which is composed of multiplicity of individual high tensile reinforcing wires disposed in parallel helical convolutions about the longitudinal axis 5 of the hose. The helices are of opposite hands in extreme pairs of wire plies 1, 2 and 3, 4, respectively. In the center of the hose, the lining tube 6 underlies innermost wire ply 1, and the outermost wire ply 4, in turn, is surrounded by a cover 7.

Figure 2:
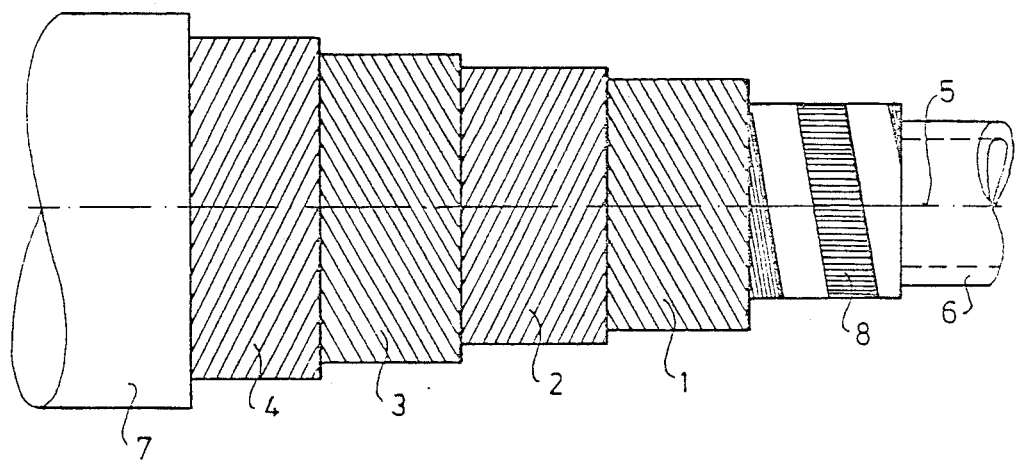

FIG. 2 illustrates, by way of example, an embodiment which differs from the previous one only in one respect. Between lining 6 and innermost wire ply 1, a spiral 8 having relatively small helix angle is provided. This spiral 8 has a high bending stiffness and, with this, the embodiment of the hose of this invention will be suitable to withstand outer hydrostatic pressure and external axial forces.

The following examples serve to illustrate, through some practical data, the essence of the invention.

EXAMPLE 1

In an embodiment of the hose according to this invention as shown in FIG. 1, four wire plies 1 to 4 are contained. The inner diameter of the hose is 50 millimeters and the diameters of the wires in the first and second plies 1 and 2 are 3.6 millimeters. The tensile strength is $F_1 = F_2 = 18\,640N$ for the wire plies 1 and 2 and $F_3 = F_4 = 23\,050N$ for wire plies 3 and 4. The elongation of the wires at rupture is for wire plies 1 and 2 $\epsilon_1 \epsilon_2 = 0.0287$ (2.87%) and for wire plies 3 and 4 $\epsilon_3 = \epsilon_4 = 0.03$ (3%). The diameter of wires in plies 3 and 4 is 4.14 millimeters. Detailed constructional data are given in the following Table 1:

TABLE 1

| Serial number of wire plies k | Mean radius of wire plies $r_k$ | Angle of lay $\alpha_k$ | Number of wires $N_k$ |
|---|---|---|---|
| 1 | 38.3 | 50.4 | 49 |
| 2 | 42.9 | 43.9 | 50 |
| 3 | 47.8 | 33.6 | 38 |
| 4 | 53.0 | 20.5 | 26 |

The burst pressure of this embodiment is 2,670 bar. The angles of lay of the respective wire plies 1 to 4 satisfy equation (1) in claim 1 (the value is 0.976, i.e. between 1.05 and 0.95 as required in claim 1) as well as equation (3) in claim 3 (the value is 0.976) and, further to this, also claim 4.

EXAMPLE 2

The hose of this example has an inner diameter of 50 millimeters and six wire plies, among which the innermost and the second one have a diameter of 3.5 millimeters, a tensile strength $F_1 = F_2 = 16,700N$ and an elongation at rupture $\epsilon_1 = \epsilon_2 = 0.035$ (35%). The further four wire plies have a diameter of 4.14 millimeters, a rupture strength of $F_3 = F_4 = F_5 = F_6 = 23\,050N$, an elongation at rupture $\epsilon_3 = \epsilon_4 = \epsilon_5 = \epsilon_6 = 0.03$ (3%). Detailed constructional data are given in the following Table 2:

TABLE 2

| Serial number of wire plies k | Mean radius of wire plies $r_k$ | Angle of lay $\alpha_k$ | Number of wires $N_k$ |
|---|---|---|---|
| 1 | 38.4 | 52.6 | 53 |
| 2 | 73.0 | 46.7 | 54 |
| 3 | 48.0 | 44.9 | 49 |
| 4 | 53.2 | 37.8 | 48 |
| 5 | 58.3 | 29.1 | 41 |
| 6 | 63.5 | 16.1 | 25 |

The bursting pressure is 3,400 bar. The angles of lay of the respective wire plies satisfy equation (1) in claim 1 (the value is 1.01) and equation (3) in claim 3 (the value is 0.997) as well as the equations (4) to (6) in claim 4.

EXAMPLE 3

Herein, the hose has an inner diameter of 110 millimeters and eight wire plies. The first four wire plies have a diameter of 3.6 millimeters, a rupture strength $F_1 = F_2 = F_3 = F_4 = 18,640N$, an elongation at rupture $\epsilon_1 = \epsilon_2 = \epsilon_3 = \epsilon_4 = 0.0287$ (2.87%) and the outer four wire plies have a diameter of 4.14 millimeters, a rupture strength $F_5 = F_6 = F_7 = F_8 = 23,050N$, and an elongation at rupture $\epsilon_5 = \epsilon_6 = \epsilon_7 = \epsilon_8 = 0.03$ (3%). Detailed constructional data are given in the following Table 3:

TABLE 3

| Serial number of wire plies k | Mean radius of wire plies $r_k$ | Angle of lay $\alpha_k$ | Number of wires $N_k$ |
|---|---|---|---|
| 1 | 68.4 | 52.7 | 92 |
| 2 | 73.1 | 49.4 | 94 |
| 3 | 77.9 | 46.0 | 94 |
| 4 | 82.7 | 42.3 | 94 |
| 5 | 87.6 | 36.4 | 76 |
| 6 | 92.8 | 31.1 | 70 |
| 7 | 97.9 | 24.9 | 60 |
| 8 | 103.1 | 16.5 | 43 |

The burst pressure is 2,850 bar. The angle of lay of the respective wire plies satisfy equation (1) in claim 1 (the value is 1.01) and equation (3) in claim 3 (the value is 1.005) as well as equations (4) to (6) in claim 4.

The previous examples show hoses constructed for having angle of lay calculated according to the invention. They have excellent strength utilization, however, the wire plies have different strength and elongation at rupture.

It is preferable to make the wire plies being closer to the hose axis of wire plies having fine, thin, resilient wires which can be laid easily even in the case of small diameter hoses. The outer wire plies being further away from the center of the hose can be made of wires having high strength. For this, a realization is shown in the following

EXAMPLE 4

The hose has an inner diameter of 63 millimeters and six wire plies. The first and second plies have a diameter of 2.9 millimeters, rupture strength $F_1=F_2=8\,500N$ and an elongation rupture $\epsilon_1=\epsilon_2=0.031$ (3.1%). The characteristics of the outer four wire plies are: diameters 3.6 millimeters, rupture strength 18,600N and elongation at rupture 0.0287 (2.87%). Detailed data of this embodiment is given in Table 4:

TABLE 4

| Serial number of wire plies $k$ | Mean radius of wire plies $r_k$ | Angle of lay $\alpha_k$ | Number of wires $N_k$ |
|---|---|---|---|
| 1 | 44.3 | 51.44 | 0.97 |
| 2 | 48.2 | 46.81 | 0.97 |
| 3 | 52.4 | 44.11 | 0.97 |
| 4 | 56.9 | 37.95 | 0.97 |
| 5 | 61.4 | 30.48 | 0.97 |
| 6 | 65.8 | 20.28 | 0.93 |

With this embodiment, too, a bursting pressure 2,500 bar can be realized. The constructional data as given above satisfy also the equations (4) to (6) in claim 4.

We claim:

1. A flexible hose with a longitudinal axis reinforced by wire plies, wherein at least two wire plies are provided and the wires of each wire ply are disposed in helical convolutions about the longitudinal axis of the hose the hose being provided with at least one inner and one outer layer, each layer impermeable to liquids, characterized in that the wire plies satisfy the following formula:

$$1.05 > \frac{\sum_{b=1}^{l} r_b N_b F_b \cos \alpha_b}{\sum_{j=1}^{m} r_j N_j F_j \cos \alpha_j} > 0.95 \tag{1}$$

wherein:
  subscript b indicated the wire plies arranged with left hand thread,
  subscript j indicated the wire plies arranged with right hand thread,
  $r_b$ and $r_j$ are the mean radii of the wire plies,
  $N_b$ and $N_j$ are the number of wires in each wire ply,
  $F_b$ and $F_j$ are the tensile strengths of the wires,
  $\alpha_b$ and $\alpha_j$ are the angles of lay of the respective wire plies,
  $l$ stands for the number of wire plies with left hand thread,
  m is the number of wire plies with right hand thread.

2. A flexible hose as claimed in claim 1, wherein all wire plies are composed of the same type of wires and the wire plies satisfy the following formula:

$$1.05 > \frac{\sum_{b=1}^{l} r_b N_b \cos \alpha_b}{\sum_{j=1}^{m} r_j N_j \cos \alpha_j} > 0.95 \tag{2}$$

where the symbols have the same meaning as given for formula (1) in claim 1.

3. A flexible hose as claimed in claim 2, wherein the wire plies also satisfy the following formula:

$$1.05 > \frac{2 \sum_{k=1}^{n} N_k F_k \sin \alpha_k}{\bar{\lambda}^2 \sum_{k=1}^{n} N_k F_k \frac{\cos^2 \alpha_k}{\sin \alpha_k}} > 0.95 \tag{3}$$

wherein:
  n is the number of wire plies, $n = l + m$,
  $\bar{\lambda}$ is the arithmetical mean value of the values $\lambda_k$, $$\bar{\lambda} = \frac{\sum_{k=1}^{n} \lambda_k}{n},$$

wherein $\lambda_k$ is the relative length of the wire plies at their rupture ($\lambda_k = 1 + \epsilon_k$).

4. A flexible hose as claimed in claim 1, wherein said hose also comprises rings or a spiral with a small helix angle being stiffer than the wires of the wire plies.

5. A flexible hose as claimed in claim 4, characterized in that the wire plies satisfy the following equations:

$$\sum_{k=1}^{n} \frac{f_k \cdot F_k}{\lambda_k \cdot d_k} \cdot \frac{1}{i_k^2} \cdot A_k = 0, \tag{4}$$

$$\sum_{k=1}^{n} \frac{f_k \cdot F_k}{\lambda_k \cdot d_k} \cdot \frac{1}{i_k} \cdot B_k = 0. \tag{5}$$

and the angles of lay of the wire plies differ maximally with 2 degrees from the angles as defined by the following equation:

$$\tan^2 \alpha_k = \frac{1 - x\lambda_k^2}{x(\lambda_k^2 - x^2)} + \frac{y}{X(\lambda_k^2 - x^2)} \cdot i_k^2 \tag{G}$$

wherein:
  $r_k$ is the mean radius of the respective wire plies,
  $n_k$ is the number of wire plies,
  x, y are the deformation parameters,
  $f_k$ is the relation of surface of the wire ply covered by the wires to the whole surface of the wire ply for the respective wire plies (covering factor),
  $F_k$ is the tensile strength of the wire for the respective wire plies,
  $d_k$ is the diameter of the respective wires,
  $i_k$ is the quotient of the mean radius of the outer wire to the mean radius of the respective wire plies,
  $\lambda_k$ is the relative high length of the respective wires at rupture, $\lambda_k = 1 + \epsilon_k$
  $\epsilon_k$ is the elongation of the wires at rupture,
  $\alpha_k$ is the angle of lay of each wire ply, $$A_k = (-1)^k C_k \sqrt{(\lambda_k^2 - C_k/x)(x_2 - \lambda_k^2)} \, (X^3 - C_k)^{-1}$$

$$B_k = [2x^2 (x\lambda_k^2 - C_k) + C_k(\lambda_k^2 - x^2)] \, [2x(X^3 - C_k)]^1$$

$$C_k = 1 = i_k^2 y.$$

6. A flexible hose as claimed in claim 5, wherein said hose contains at least two and maximally eight wire plies and the wire plies are made of the same type of reinforcing wires having the same characteristics, and the covering factor as well as the distance between the neighboring wire plies are essentially constant, and the angle of lay of the wire plies differ maximally by 2 degrees from the angles given by the following equation:

$$\tan^2 \alpha_k = \frac{b_k - a_k}{2} \, 100\epsilon + 2a_k - b_k \tag{7}$$

where, in the case of two wire plies:

$$a_k = -0.9z^2 + 0.13z - 2.516 + (6.6z^2 - 3.13z + 3.03 - 0)i_k 2$$

$$b_k = -1.4z^2 + 0.08z - 2.529 + (7.0z^2 - 3.09z + 3.058)i_k 2$$

$$i_k = 1/(1-(2-k)z), (k=1, 2);$$

in the case of four wire plies:

$$a_k = 1 - 1/(-1.712z^2 + 2.0033z + 0.25743) + (1/(-1.841z^2 + 2.1187z + 0.22679) - 1)i_k^2,$$

$$b_k = 1 - 1/(-1.712z^2 + 1.8878z + 0.25760) + (1/(-1.892z^2 + 2.0108z + 0.22629) - 1)i_k^2,$$

$$i_k = 1/(1-(4-k)z) \, (k=1; 2; 3; 4);$$

in the case of six wire plies:

$$a_k = 1 - 1/(-91.94z^3 + 11.216z^2 + 2.6340z + 0.26816) + (1/(-81.77z^3 + 8.886z^2 + 2.9525z + 0.23550) - 1)i_k^2,$$

$$b_k = 1 - 1/(-88.90z^3 + 10.729z^2 + 2.4706z + 0.26777) + (1/(-77.45z3 + 8.107z^2 + 2.8062z + 0.23442) - 1)i_k^2,$$

$$i_k = 1/(1-(6-k)z) \, (k=1; 2 \ldots; 6);$$

in the case of eight wire plies:

$$a_k = 1 - 1/(-81.170z^3 + 1.587z^2 + 4.7941z + 0.25088) + (1/(-91.99z^3 + 0.626z^2 + 5.0079z + 0.22195) - 1)i_k 2,$$

$$b_k - 1 - 1/(-76.99z^3 + 1.895z^2 + 4.5366z + 0.25093) + (1/(86.27z^3 + 1.176z^2 + 4.7565z + 0.22160) - 1)i_k - 2,$$

$$i_k = 1/(1-(8-k)z) \, (k=1; 2 \ldots; 8);$$

and $z = \Delta r/r_n$, where $\Delta r$ is the difference between the mean radii of the neighboring wire plies and $r_n$ is the mean radius of the outer wire ply.

7. A flexible hose as claimed in claim 6, wherein said base comprises four wire plies, and the angle of lay of the innermost wire ply is between 41 to 54 degrees, that of the next, wire ply is between 37 and 46 degrees, that of the third wire ply is between 32 and 36 degrees and the outermot fourth wire ply angle of lay is between 16 and 31 degrees.

8. A flexible hose as claimed in claim 6, wherein said hose comprises six wire plies, and the angle of lay of the innermost wire ply is between 43 and 58 degrees, that of the next wire ply is between 40 and 52 degrees, that of the third wire ply is between 37 and 45 degrees, that of the fourth wire ply is between 33 and 38 degrees, that of the fifth wire ply is between25 and 32 degrees and that of the outermost wire ply is between 12 and 27 degrees.

9. A flexible hose as claimed in claim 6, wherein said hose comprises eight wire plies, and the angle of lay of the innermost wire ply is between 45 and 61 degrees, that of the next wire ply is between 43 and 56 degrees, that of the third wire ply is between 40 and 51 degrees, that of the fourth wire ply is between 37 and 46 degrees, that of the fifth wire ply is between 34 and 40 degrees, that of the sixth wire ply is between 29 and 34 degrees, that of the seventh wire ply is between 21 and 30 degrees and that of the outermost wire ply is between 10 and 24 degrees.

10. A flexible hose with a longitudinal axis and an interior diameter of 50 to 100 mm reinforced by wire plies forming layers, wherein at least two and no more than eight wire ply layers are provided and the wire of each wire ply layer are wrapped about an inner, liquid impermeable, layer in a helical manner with an angle of lay such that the following formula is satisfied:

$$1.05 > \frac{\sum_{b=1}^{l} r_b N_b F_b \cos \alpha_b}{\sum_{j=1}^{m} r_j N_j F_j \cos \alpha_j} > 0.95 \tag{8}$$

wherein:
subscript b indicated the wire plies arranged with left hand thread,
subscript j indicates the wire plies arranged with right hand thread,
$r_b$ and $r_j$ are the mean radii of the wire plies,
$N_b$ and $N_j$ are the number of wires in each wire ply,
$F_b$ and $F_j$ are the tensile strengths of the wires,
$\alpha_b$ and $\alpha_j$ are the angles of lay of the respective wire plies,
l stands for the number of wire plies with left hand thread,
m is the number of wire plies with right hand thread.
where each wire ply layer is of a different "handedness" than any adjacent wire ply layer and the flexible hose is provided with an outer, liquid impermeable layer.

11. A flexible hose as claimed in claim 10, wherein the angle of lay is smaller for each succeeding wire ply layer starting with the innermost layer.

* * * * *

UNITED STATES PATENT AND TRADEMARK OFFICE
CERTIFICATE OF CORRECTION

PATENT NO. : 4,860,798

DATED : August 29, 1989

INVENTOR(S) : Ferenc Kovacs et al

It is certified that error appears in the above-identified patent and that said Letters Patent is hereby corrected as shown below:

In column 7, Table 4, delete "0.97" in the second instance and substitute --74--.

Signed and Sealed this

Seventh Day of January, 1992

Attest:

HARRY F. MANBECK, JR.

Attesting Officer

Commissioner of Patents and Trademarks